United States Patent [19]

Goto

[11] Patent Number: 5,025,409

[45] Date of Patent: Jun. 18, 1991

[54] CARRY PROPAGATION CIRCUIT OF PARALLEL-TYPE FULL ADDER

[75] Inventor: Gensuke Goto, Ebina, Japan

[73] Assignee: Fujitsu Limited, Kawasaki, Japan

[21] Appl. No.: 366,541

[22] Filed: Jun. 15, 1989

[30] Foreign Application Priority Data

Jun. 15, 1988 [JP] Japan .................. 63-147821

[51] Int. Cl.⁵ .............................................. G06F 7/50
[52] U.S. Cl. ................................................. 364/786
[58] Field of Search ................................... 364/786

[56] References Cited

U.S. PATENT DOCUMENTS 4,763,295 9/1988 Yamada et al. ............... 364/786
4,807,176 2/1989 Yamada et al. ............... 364/786

FOREIGN PATENT DOCUMENTS 62-32532 2/1987 Japan .

Primary Examiner—David H. Malzann

Attorney, Agent, or Firm—Staas & Halsey

[57] ABSTRACT

A carry propagation circuit of a parallel-type full adder having a plurality of bits. The carry propagation circuit includes: a control unit for controlling a carry propagation; a main path including a plurality of transfer circuits serially connected and provided for each of the plurality of bits, each transferring a carry signal from a lower bit to a higher bit when it is brought to an ON state by the control unit; and at least one bypath arranged to bypass a predetermined number of the transfer circuits and brought to an enable state or a disable state by the control unit. When the control unit brings the bypath to the enable state, it brings to the OFF state a transfer circuit provided immediately in the lower bit side of the main path seen from a terminated point of the bypath and thus propagates only a carry signal propagated via the bypath to the higher bit side. This contributes to reducing the propagation delay time required for a carry operation to the minimum and thus realizing a high speed operational processing.

9 Claims, 10 Drawing Sheets

Fig. 7C PRIOR ART
($P_i = A_i \oplus B_i$)

Fig. 7B
($P_i = A_i \oplus B_i$)

CARRY PROPAGATION CIRCUIT OF PARALLEL-TYPE FULL ADDER

BACKGROUND OF THE INVENTION

1. Field of the Invention

The present invention relates to a carry propagation circuit of a parallel-type full adder. More particularly, it relates to a constitution of a circuit for propagating a carry signal at high speed from a lower bit to a higher bit in a parallel-type full adder having a plurality of bits and constituted by digital logic circuits.

2. Description of the Related Art

With recent developments in large scale integration (LSI) technology, demand has been increasing for high-level integration of a multi-bit (32 bits or more) parallel-type full adder for realization of high-speed processing. To cope with this, various approaches to provide a bypath or bypaths in a carry propagation circuit, and thus to constitute a high speed adder, have been proposed. As an example of the approaches, a so-called Manchester-type carry propagation circuit is known in which a plurality of transfer or transmission gates (TGs) are serially connected in multiple stages to constitute a Manchester carry chain and a number of bypaths are appropriately arranged in the Manchester carry chain. The Manchester-type carry propagate circuit has an advantage of realizing a high speed operation with a small number of elements, compared with other approaches.

Even in this approach, however, there are several drawbacks to be improved as described later in detail. For example, as the number of bits to be simultaneously processed is increased, a signal propagation delay becomes significant, and accordingly, room for improvement still remains. Thus, a novel approach for the arrangement of bypaths is desired which enables increased, high speed operation.

SUMMARY OF THE INVENTION

An object of the present invention is to provide a carry propagation circuit of a parallel-type full adder which can reduce a propagation delay time required for a carry operation to the minimum and thus realize a high speed operational processing.

According to the present invention, there is provided a carry propagation circuit of a parallel-type full adder having a constitution of a plurality of bits, the carry propagation circuit including: a control unit for controlling a carry propagation; a main path including a plurality of transfer circuits serially connected and provided for each of the plurality of bits, each transferring a carry signal from a lower bit to a higher bit when it is brought to an ON state by the control unit; and at least one bypath arranged to bypass a predetermined number of the transfer circuits and which is brought to an enable state or a disable state by the control unit, wherein, when the control unit brings the bypath to the enable state, it brings to the OFF state a transfer circuit, which is provided directly in the lower bit side of the main path as seen from a terminated point of the bypath and thus propagates only a carry signal propagated, via the bypath to the higher bit side.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

For a better understanding of the preferred embodiments of the present invention, the problems in the prior art will be explained with reference to FIGS. 1 and 2.

Figure 1:
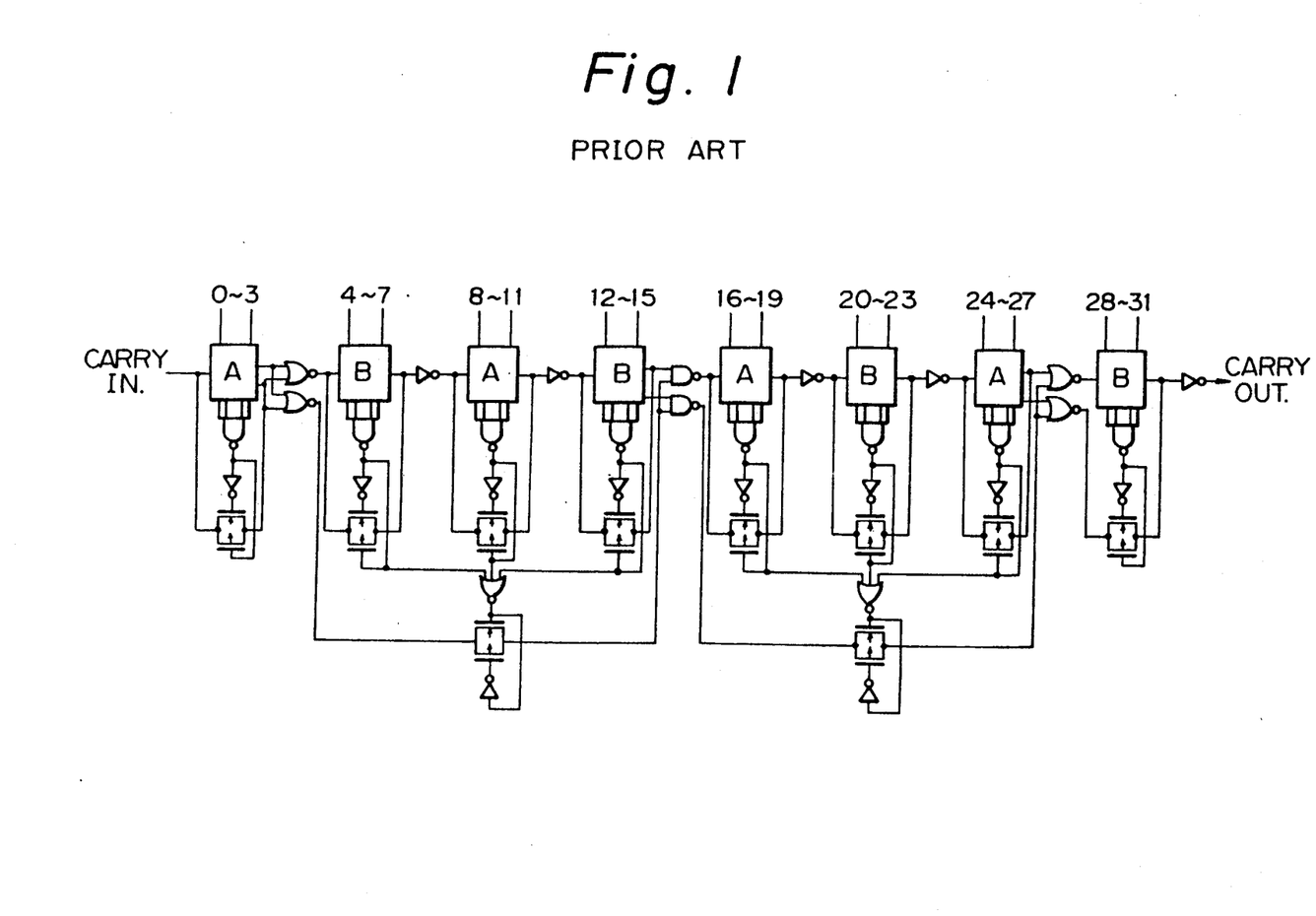
FIG. 1 is a circuit diagram illustrating a constitution of a carry propagation circuit of a prior art thirty-two bit parallel-type full adder.

FIG. 1 illustrates a constitution of a carry propagation circuit of a prior art thirty-two bit parallel-type full adder.

The illustration shows an example of the Manchester-type carry propagation circuit in which a number of transfer gates (TGs) are serially connected in multiple stages and a number of bypaths are appropriately arranged between each node. In this case, each of the transfer gates is constituted by a P-channel MOS field effect transistor (FET) and an N-channel MOSFET connected in parallel with each other. Also, reference A denotes a positive logic carry block including a four-bit full adder and reference B denotes a negative logic carry block including a four-bit full adder. This carry propagation circuit based on the Manchester-type approach can realize high speed operation with a small number of elements, compared with other approaches, and thus is utilized, mainly by incorporation into a microprocessor or the like. However, room for improvement remains in the following points:

(1) Since the carry propagation bypath is terminated at an input end of the two-input NAND gate or two-input NOR gate, a signal propagation delay in the NAND gate or NOR gate per se is added to a delay required for passing through the transfer gate. The delay time for the transfer gate of one stage is hereinafter indicated by reference $\tau_o$. The addition of the delay time further prolongs the carry propagation time and thus is not desired.

(2) A propagation delay of a carry signal in a critical path, hereinafter indicated by reference $\tau_C$, is defined by a time in which a carry signal occurring in the fourth bit is propagated to the twenty-sixth bit. This delay time is represented by the following equation;

$$\tau_c = 2(3\tau_O + \tau_I) + 3(\tau_O + \tau_I) +$$
$$(\tau_O + \tau_D) - \tau_I$$
$$= 10\tau_O + 4\tau_I + \tau_D,$$

where reference $\tau_I$ indicates a delay time for one inverter and reference $\tau_D$ indicates a delay time for one two-input NAND gate. In this case, room for improvement remains in that the delay time $\tau_C$ could be reduced by suitably devising the arrangement of bypaths.

Figure 2:
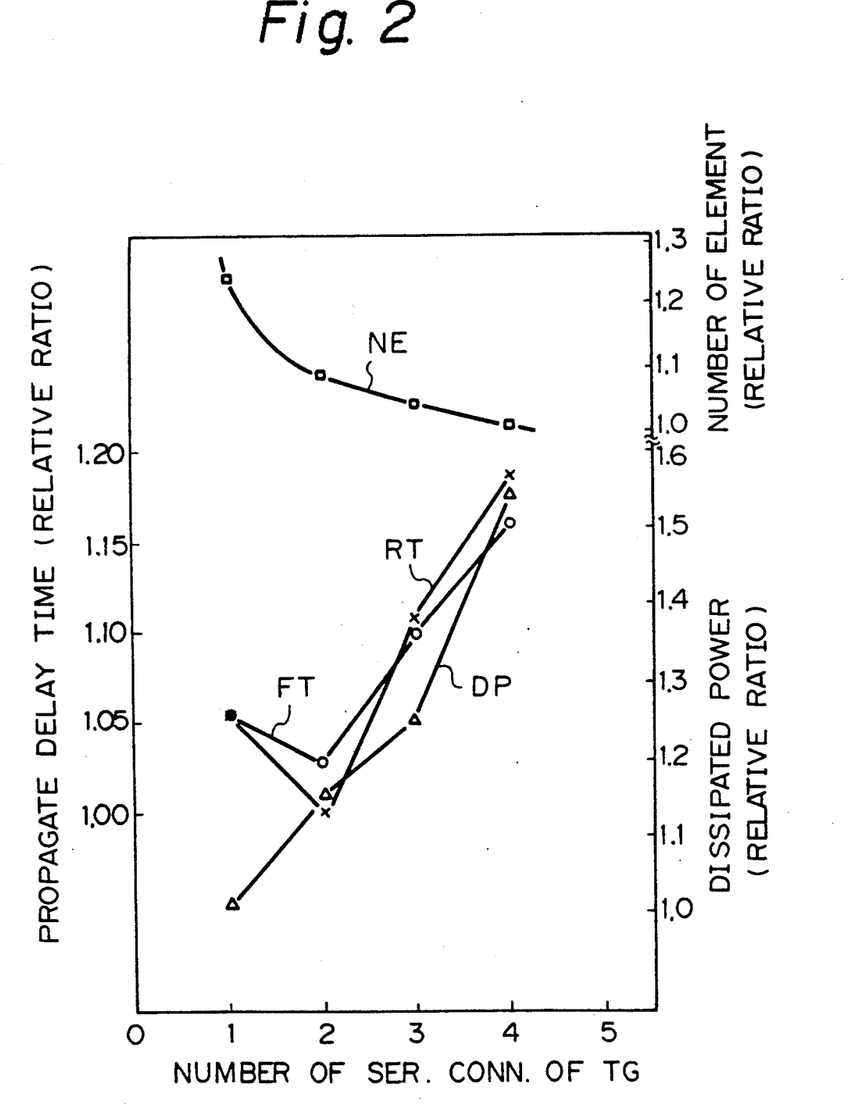
FIG. 2 is a graph showing relations between the number of serial connections of transfer gates (TG) employed in a carry propagate circuit and the related performances.

(3) The present inventor reached the following conclusions as a result of studies (see FIG. 2). Note, the data shown in FIG. 2 are based on the results obtained when a circuit simulation is carried out using 1.3 μm CMOS elements. In the illustration, reference NE indicates a number of transistor element employed; reference RT a propagation delay time occurring at the rise of the carry signal; reference FT a propagation delay time occurring at the fall of the carry signal; and reference DP the dissipated power. One of the conclusions obtained is that, where a circuit is constituted using CMOS elements having a gate length of 1.5 μm or less, it is preferable that the number of serial connections of transfer gates be three or less. Another of the conclusions is that, according to the constitution in which the number of serial connections of transfer gates is four or more (see FIG. 7C), a problem occurs in that the signal waveform is deformed by the influence of the ON resistance of transfer gates and the parasitic capacitance such as a source/drain diffusion capacitance occurring at each node and, accordingly, the delay time and dissipated power are increased.

(4) According to the constitution of FIG. 1, positive logic is used together with negative logic in accordance with the polarity of each carry signal propagated to each bit, and thus the output of the sum of each bit is obtained. However, the mixture of the positive and negative logics in an identical circuit causes an unnecessary disorder in circuit design and complicates failure analysis, verification, or the like after the circuit in made, and thus is not desired.

Figure 3:
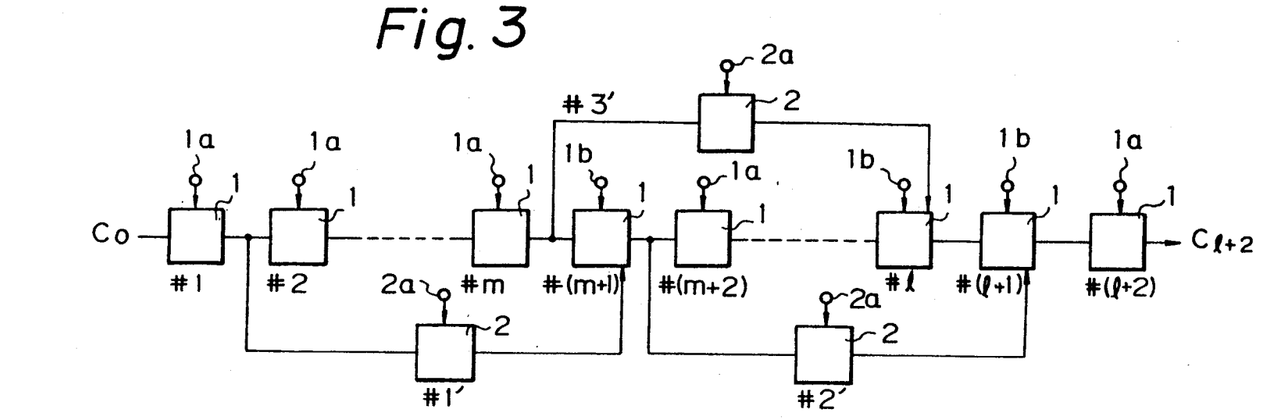
FIG. 3 is a view schematically illustrating a fundamental constitution of the carry propagation circuit of the parallel-type full adder according to the present invention.

FIG. 3 schematically illustrates a fundamental constitution of the carry propagate circuit of the parallel-type full adder according to the present invention.

Figure 4A:
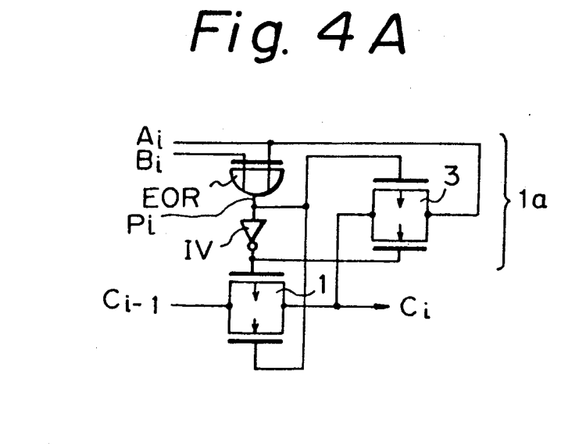
FIGS. 4A and 4B are views illustrating a constitution of the carry block shown in FIG. 3.
Figures 5A, 5B:
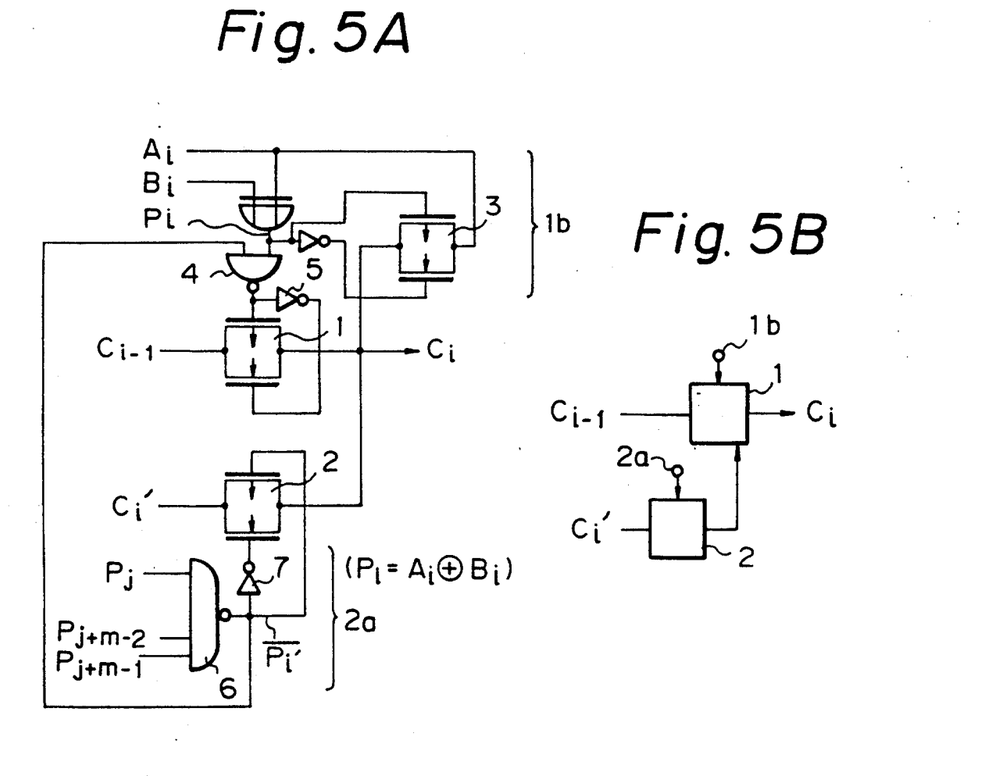
FIGS. 5A and 5B are views illustrating another constitution of the carry block shown in FIG. 3.

In FIG. 3, references #1, #2, ... denote propagation paths constituting a main path on which a carry signal is propagated and references #1', #2', ... denote bypaths on which a carry signal is propagated. References 1 and 2 denote carry signal transfer circuits for transferring a carry signal from a lower bit to a higher bit, each being constituted by a transfer gate (TG) consisting of a P-channel MOSFET and an N-channel MOSFET connected in parallel with each other, as shown in FIGS. 4A and 5A. Also, references 1a, 1b and 2a denote TG control circuits for effecting ON/OFF control of the corresponding transfer gate 1,2, i.e., for opening or closing the gate.

Figure 4B:
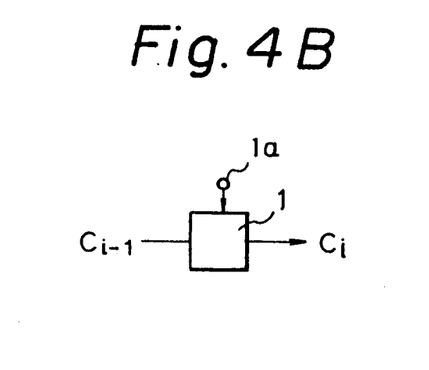

FIG. 4A illustrates a circuit constitution of the carry block shown in FIG. 3, and FIG. 4B schematically shows the circuit constitution. The illustrated carry block corresponds to one bit and is constituted by the transfer gate 1 and TG control circuit 1a.

In FIG. 4A, references $A_i$ and $B_i$ denote the i-th bits in n-bit binaries A and B to be summed, respectively, and reference $C_i$ denotes a carry signal which is defined by the logical equation of the corresponding bit signals $A_i$, $B_i$ and a carry signal $C_{i-1}$ propagated from the (i−1)-th bit ($C_i = A_i \cdot B_i + C_{i-1} \cdot (A_i + B_i)$). The TG control circuit 1a includes an exclusive-OR gate EOR responsive to the bit signals $A_i$, $B_i$, an inverter IV responsive to an output of the exclusive-OR gate, and a transfer gate 3 having the same constitution as the transfer gate 1 and responsive to an output of the inverter and the output of the exclusive-OR gate. The output of the exclusive-OR gate EOR is indicated by reference $P_i$ and hereinafter referred to as a carry propagation signal.

When the carry propagation signal $P_i$ is at a "1" level, the output of the inverter IV is at a "0" level, so that the transfer gate 3 is closed (OFF) and the transfer gate 1 is opened (ON). Namely, the TG control circuit 1a brings the transfer gate 1 to the ON state. In this case, the carry signal $C_{i-1}$ propagated from the lower bit is propagated through the transfer gate 1 to the higher bit. Conversely, when the carry propagation signal $P_i$ is at "0" level, the transfer gate 3 is opened and the transfer gate 1 is closed. Namely, the TG control circuit 1a brings the transfer gate 1 to the OFF state. In this case, the propagation of the carry signal $C_{i-1}$ to the higher bit is prevented and, instead, the transfer gate 3 transfers the bit signal $A_i$ to generate the carry signal $C_i$. Fundamentally, serial connection of the transfer gates 1 of a plurality of stages constitutes a path for ripple propagation of the carry signal to the higher bit, i.e., the main path.

FIG. 5A illustrates another circuit constitution of the carry block shown in FIG. 3, and FIG. 5B schematically shows the circuit constitution. The illustrated carry block corresponds to one bit and is constituted by the transfer gates 1, 2 and TG control circuits 1b, 2a.

The TG control circuit 1b has the same circuit constitution as the TG control circuit 1a, except that it further includes a NAND gate 4 responsive to a carry propagation signal $P_i'$ and the output $P_i$ of the exclusively-OR gate and an inverter 5 responsive to an output of the NAND gate 4. On the other hand, the TG control circuit 2a includes a NAND gate 6 responsive to carry propagation signals $P_k$ (k=j, j+1, . . . , j+m−2, j+m−1) generated in each propagation path of the main path to be bypassed and an inverter 7 responsive to the output $P_i'$ of the NAND gate 6. An output end of the transfer gate 2 provided on the bypath is connected to an output end of the transfer gate 1 provided on the propagation path of the main path.

When the carry propagation signals $P_k$ (k=j, j+1, . . . , j+m−2, j+m−1) are all at "1" level, the output of the NAND gate 6 is at "0" level and the output of the inverter 7 is at "1" level, so that the transfer gate 1 is closed (OFF) and the transfer gate 2 is opened (ON). Namely, the TG control circuit 2a brings the transfer gate 2 to the ON state and thus brings the corresponding bypath to an enabled state. This enable state is hereinafter referred to as an ON state of the bypath. In this case, the propagation of the carry signal $C_{i-1}$ to the higher bit is prevented. Conversely, when any one of the carry propagation signals $P_k$ is at "0" level, the transfer gate 1 is opened and the transfer gate 2 is closed. Namely, the TG control circuit 2a brings the transfer gate 2 to the OFF state and thus brings the corresponding bypath to a disabled state. This disabled state is hereinafter referred to as an OFF state of the bypath. In this case, the carry signal $C_{i-1}$ is propagated from the lower bit through the transfer gate 1 to the higher bit.

Therefore, a combination of the gates 4~7 has a function of selectively bringing one of the transfer gates 1 and 2 to the ON state. As a result, it is possible to avoid a collision or conflict between the signal propagated via the bypath and the signal propagated via the main path.

Referring to FIG. 3, besides the ordinary bypaths #1' and #2', a third bypath #3' is added to the main path. The additional bypath #3' is arranged so that it has its beginning point between two adjacent transfer gates bypassed by one (#1') of two bypaths which do not overlap each other and its terminated point at an output node of one of the transfer gates bypassed by another (#2') thereof. The arrangement of the additional bypath contributes to a decrease in the number of transfer gates through which the carry signal passes. This leads to a reduction in propagation delay time of the carry signal and a speed-up of the processing. Namely, it is possible to solve the prior art problem (1) by the introduction of the TG control circuit 1b and solve the problem (2) by the introduction of the additional bypath #3'.

Also, as shown in FIG. 5A, the terminated point of the bypath is connected in a wired-OR form to a terminated point of the propagation path of the main path, and the transfer gate 1 positioned immediately in the lower bit side of the main path seen from the terminated point is brought to the OFF state when the bypath is brought to the ON state. Accordingly, it is possible to avoid the use of a multi-input combination circuit such as a NAND gate, NOR gate or the like as employed in the prior art.

Next, the necessity to bring the main path to the OFF state in the wired-OR connection will be explained with reference to FIG. 6.

Figure 6:
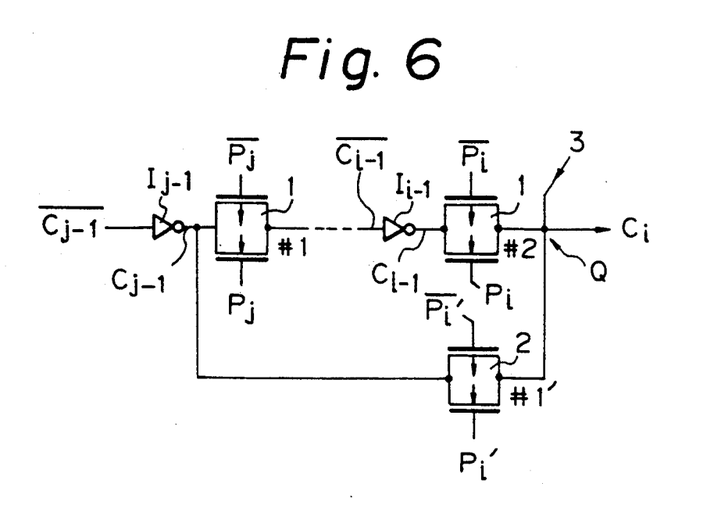
FIG. 6 is a view for explaining the operation of the circuit shown in FIGS. 5A and 5B.

Referring to FIG. 6, a main path on which a carry signal is propagated from the j-th bit to the i-th bit and a bypath for bypassing the j-th bit to the i-th bit are illustrated. Although the inverter serving as a waveform shaper is omitted in each constitution of the FIGS. 3~5B, it is preferable to suitably insert inverters into the main path to solve the prior art problem (3). In the illustration of FIG. 6, two inverters $I_{j-1}$, $I_{i-1}$ are provided. Assuming that all of the carry propagation signals $P_j \sim P_i$ and $P_i'$ are at "0" level, all of the transfer gates 1,2 provided on the paths #1, #2 and #1' are brought to the OFF state. In this case, since the transfer gate 3 is brought to the ON state (see FIG. 5A), the output signal $C_i$ is represented by the carry signal ($A_i \cdot B_i$) of the i-th bit. Furthermore, assume that the bit signals $A_i$, $B_i$ and the carry signals $C_{j-1}$, $C_{i-1}$ are all at "0" level. Next, when all of the signals $P_j \sim P_i$ and $C_{j-1}$ are made "1" level at a certain timing, the transfer gates 1 of the j-th bit to the i-th bit are all brought to the ON state. When the signal $P_i'$ is then made "1" level, the transfer gate 2 of the path #1' is also brought to the ON state.

Since the transfer gate 1 of the path #2 is first turned ON, the output $C_{i-1}$ of the inverter $I_{i-1}$ is propagated to the output end Q to form the output $C_i$. In this case, the output $C_i$ keeps the value of the previous state ("0"). When the transfer gate 2 of the path #1' is then turned ON, the carry signal $C_{j-1}$ ("1") fed from the inverter $I_{j-1}$ is propagated via the transfer gate 2 to the output end Q. As a result, a conflict between the "0" signal and the "1" signal occurs at the output end Q. This conflict is caused by the inverter $I_{i-1}$ keeping the previous state and the inverter $I_{j-1}$ providing a new state. Thus, if the current driving ability of the inverter $I_{j-1}$ is selected to be much greater than that of the inverter $I_{i-1}$, or if the ON resistance of the transfer gate 2 of the path #1' is selected to be smaller than that of the transfer gate 1 of the path #2, it might be possible to avoid the conflict. However, it is impossible to completely avoid the conflict unless, before the transfer gate 2 of the path #1' is turned ON, the output $C_{i-1}$ of the inverter $I_{i-1}$ is changed from "0" to "1". After all, the effect based on the arrangement of bypaths is weakened.

Therefore, where a transfer gate provided immediately in the lower bit side of the main path connected in the wired-OR form to the terminated point of a certain bypath is brought to the OFF state immediately after the transfer gate provided on the bypath is turned ON, it becomes possible to avoid the conflict. In the carry propagation circuit using a triple or more bypath as well, where a transfer gate on an outermost bypath is turned ON, it is possible to solve the problem of the conflict by bringing to the OFF state those transfer circuits included in all of the inner bypaths connected to a terminated point of the outermost bypath and a transfer circuit provided immediately in the lower bit side of the main path seen from the terminated point of the outermost bypath.

Next, the operation of the novel approach concerning the arrangement of bypaths will be explained.

In the prior art arrangement of a multiple bypath, each bypath is arranged in a form of a nest, i.e., in such a manner that an inner bypath is perfectly involved in an outer bypath. Although this approach has an advantage in that the form of the circuit becomes regular or systematic, it also has a disadvantage in that it is difficult to shorten the propagation path as the number of bypaths is increased. For example, referring to FIG. 1, a duplicate bypath is provided which bypasses three blocks, each being constituted by four bits, and the longest critical path includes transfer gates of ten stages. Even if another bypath is arranged outside the outermost bypath, however, the critical path cannot be reduced any more.

Contrary to this, according to the fundamental constitution of present invention shown in FIG. 3, it is possible to reduce the critical path by arranging the bypath (#3') so that it has its beginning point between two adjacent transfer gates bypassed by one (#1') of two bypaths and its terminated point at an output node of one of the transfer gates bypassed by the other (#2') of the two bypaths.

Next, the preferred embodiments of the present invention will be explained with reference to FIGS. 7A to 9C.

Figure 7A:
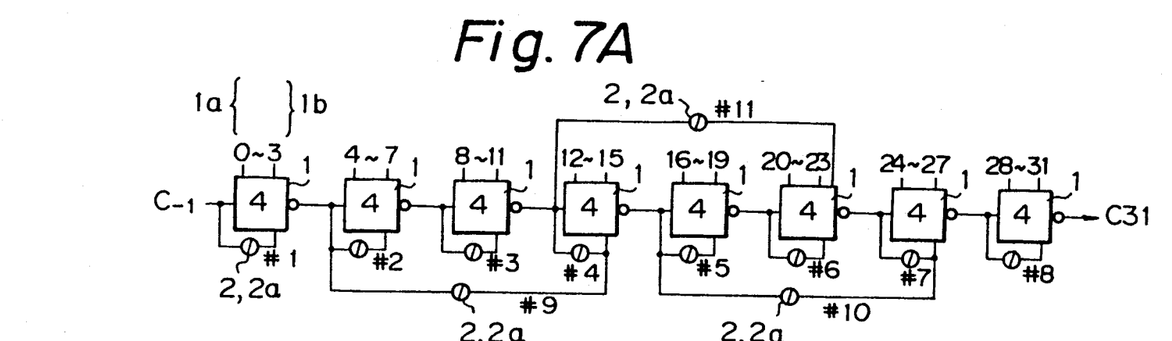
FIGS. 7A to 7C are views for explaining an embodiment of the present invention.
Figure 7B:
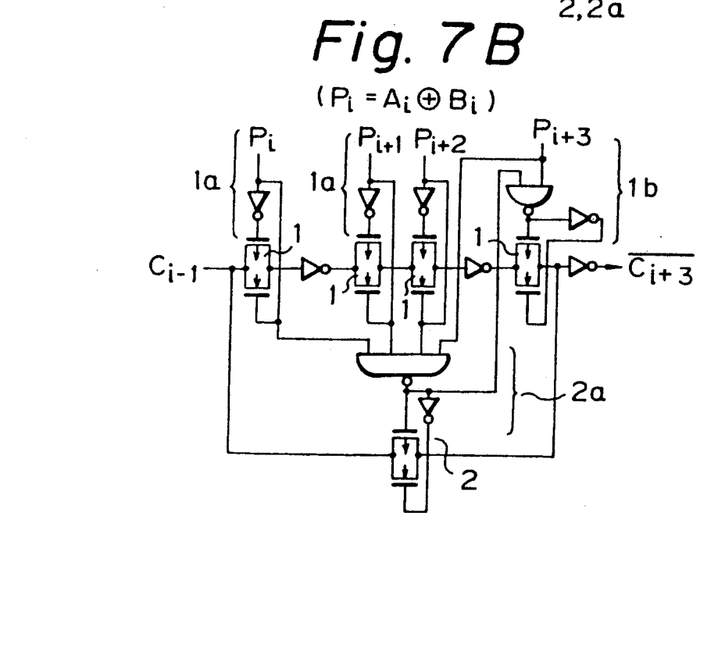
Figure 7C:
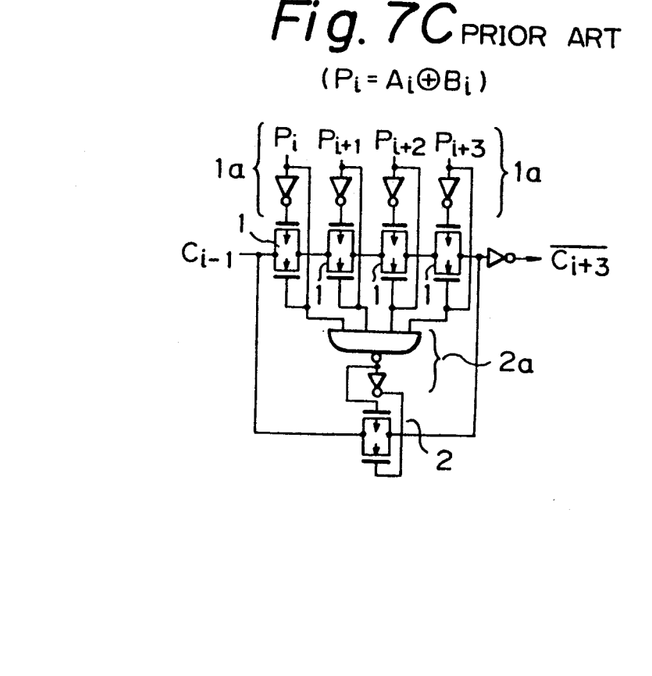

FIG. 7A schematically illustrates a constitution of the carry propagation circuit of the thirty-two bit parallel-type full adder as an embodiment of the present invention. FIG. 7B illustrates a circuit constitution of the carry block by units of four bits shown in FIG. 7A, and FIG. 7C illustrates a circuit constitution of the prior art carry block, contrasted with FIG. 7B.

The carry block by units of four bits includes a serial connection of four stages, each stage being constituted by the transfer gate 1 and the TG control circuit 1a or 1b, and also includes inverters for shaping waveforms. For simplification of the explanation, the carry signal generating portion in the TG control circuit 1a, 1b of each bit is not shown. The indication ⓞ shown on the bypath of FIG. 7A represents a combination of the transfer gate 2 and TG control circuit 2a shown in FIG. 5A. In FIG. 7B, each of the ith to (i+2)-th bit is constituted by the transfer gate 1 and TG control circuit 1a and the (i+3)-th bit is constituted by the transfer gate 1 and TG control circuit 1b. According to the constitution of FIG. 7B, since three inverters are suitably incorporated into the four-bit bypath, it is possible to solve the prior art problem (3) and effectively carry out a distribution of loads. Also, to solve the problem (4), the form of use of the circuit which generates a sum signal of each bit, i.e., an exclusive -OR signal of $A_i$, $B_i$ and $C_{i-1}$, needs to be changed in accordance with the polarity of the signal $C_{i-1}$. Since the form of use is not directly concerned with the carry propagation operation per se, the explanation thereof is omitted.

In FIG. 7A, the arrangement of bypaths #1~190 10 excluding the bypath #11, is the same as the prior art. By the arrangement of the bypath #11, it is possible to reduce the number of transfer gates through which the carry signal passes from ten to nine. Namely, it becomes possible to reduce the number of transfer gates through which the carry signal passes by adding an appropriate number of bypaths to the critical path. In this case, the bypath to be added has its beginning point inside one of the outermost bypaths among the bypaths provided in the form of the nest and its terminated point inside another thereof.

According to the constitution of FIG. 7A, the delay time in the critical path is represented by the following equation:

$$\tau_{CO}=5<<\tau_O+\tau_I>>+2<<2\tau_O+\tau_I>>+\tau_I$$

where reference $\tau_O$ indicates a delay time for one transfer gate and reference $\tau_I$ indicates a delay time for one inverter. Referring to FIGS. 2, 7A and 7B, it can be appreciated that it is possible to realize a reduction of 10% or more in the propagation delay time in the form of the connections of FIG. 7A (the number of serial connection of transfer gates is two), compared with the form of the connection of FIG. 7B (the number of serial connections of transfer gates is four). Namely, $2<<2\tau_O+\tau_I>><<<4\tau_O+\tau_I>>$. Note, the delay time enclosed in marks ($<<$, $>>$) is not based on the arithmetic addition but based on the operation of the entire circuit. As described before, the delay time in the critical path according to the prior art is represented by the following equation;

$$\tau_C=2<<3\tau_O+\tau_I>>+3<<\tau_O+\tau_I>>+(\tau_O+\tau_D)-\tau_I$$

Considering that $<<3\tau_O+\tau_I>>>>3<<\tau_O+\tau_I>>$ and $(\tau_D-\tau_I)>\tau_I$, $\tau_C>10<<\tau_O+\tau_I>>$, while $\tau_{CO}<9<<\tau_O+\tau_I>>+\tau_I$. Therefore, according to the embodiment shown in FIGS. 7A and 7B, it is possible to reduce a carry propagation delay by the delay time of the transfer gate of one stage, compared with the prior art.

Figure 8A:
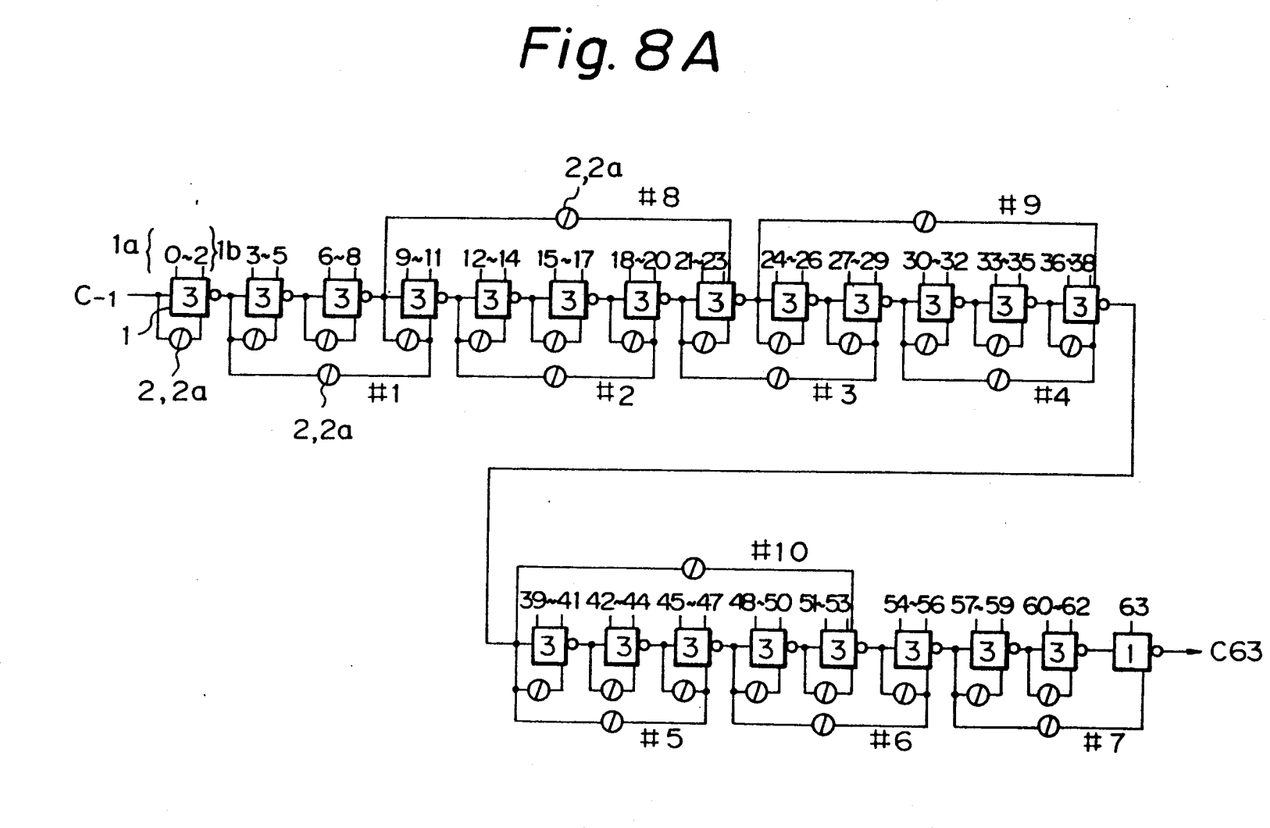
FIGS. 8A and 8B are views schematically illustrating circuit constitutions according to another embodiment of the present invention.
Figure 8B:
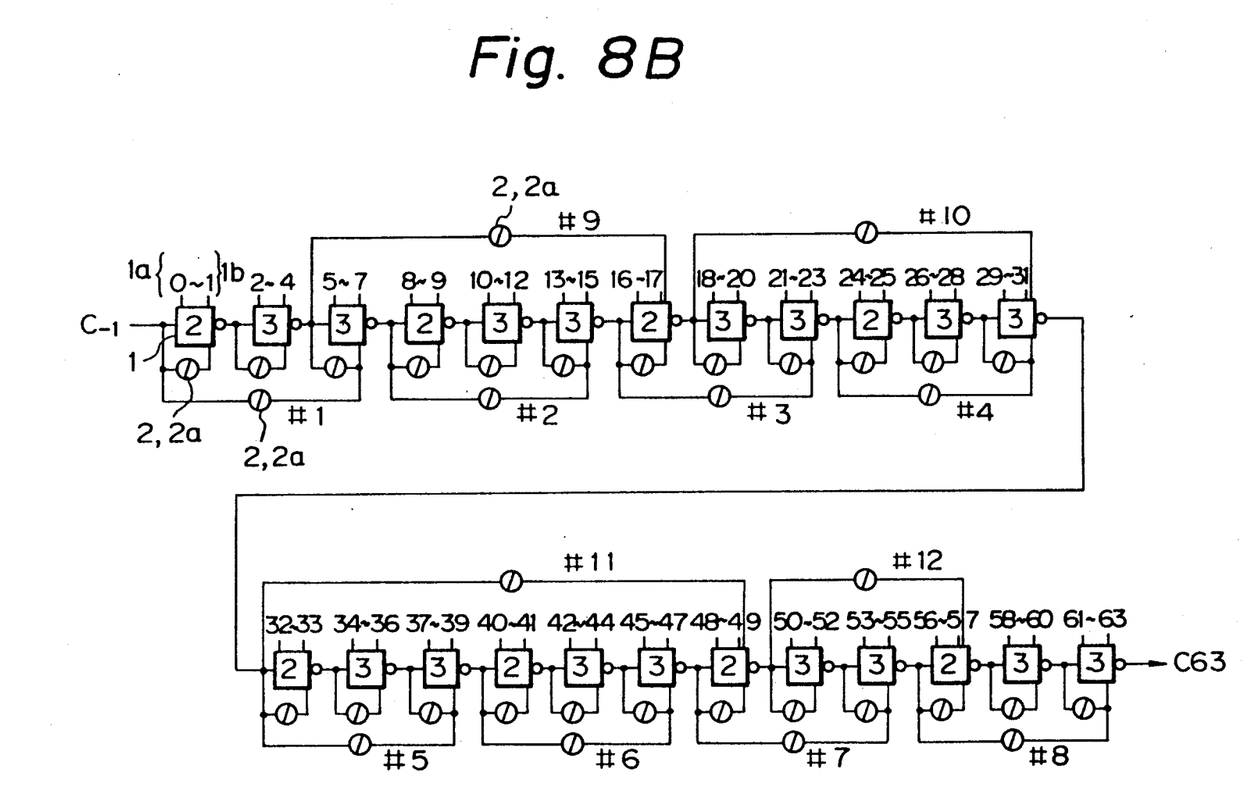

FIGS. 8A and 8B schematically illustrate constitutions according to another embodiment of the present invention, each showing a constitution of the carry propagation circuit capable of reducing a critical path on the assumption that a triple bypath is applied to the sixty-four bit parallel-type full adder.

The circuit of FIG. 8A includes: a main path constituted by a plurality of blocks, each having a first bypath with units of three bits; second bypaths #1~#7, each bypassing three of the first bypaths; and outermost bypaths #8~#10, each being arranged to cover two of the second bypaths. In this constitution, the longest critical path includes transfer gates of eleven stages. On the other hand, the circuit of FIG. 8B includes: a main path constituted by a plurality of blocks, each having a first bypath with units of two or three bits; second bypaths #1~#8, each bypassing three of the first bypaths; and outermost bypaths #9~#12, each being arranged to cover two of the second bypaths. In this case, the longest critical path includes transfer gates of ten stages.

Figure 9A:
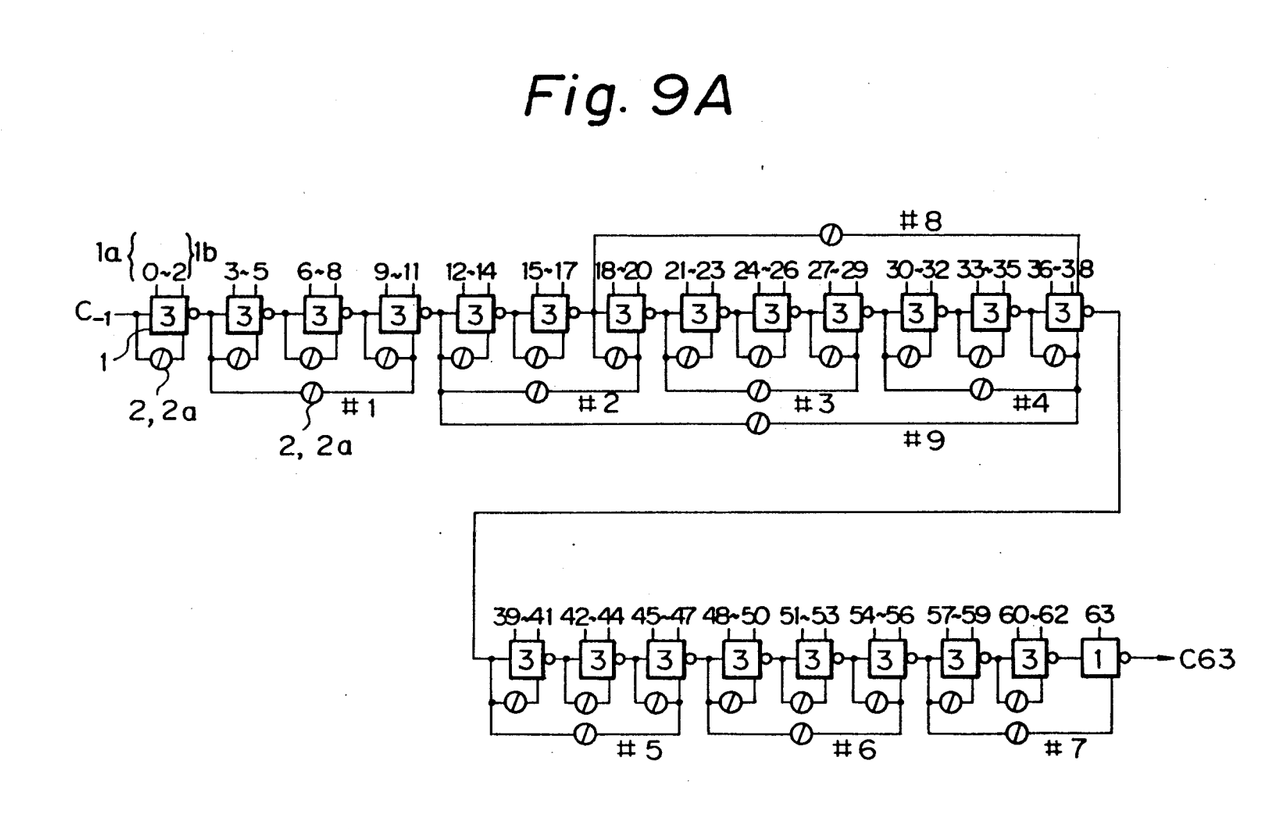
FIGS. 9A to 9C are views schematically illustrating circuit constitutions according to still another embodiment of the present invention.
Figure 9B:
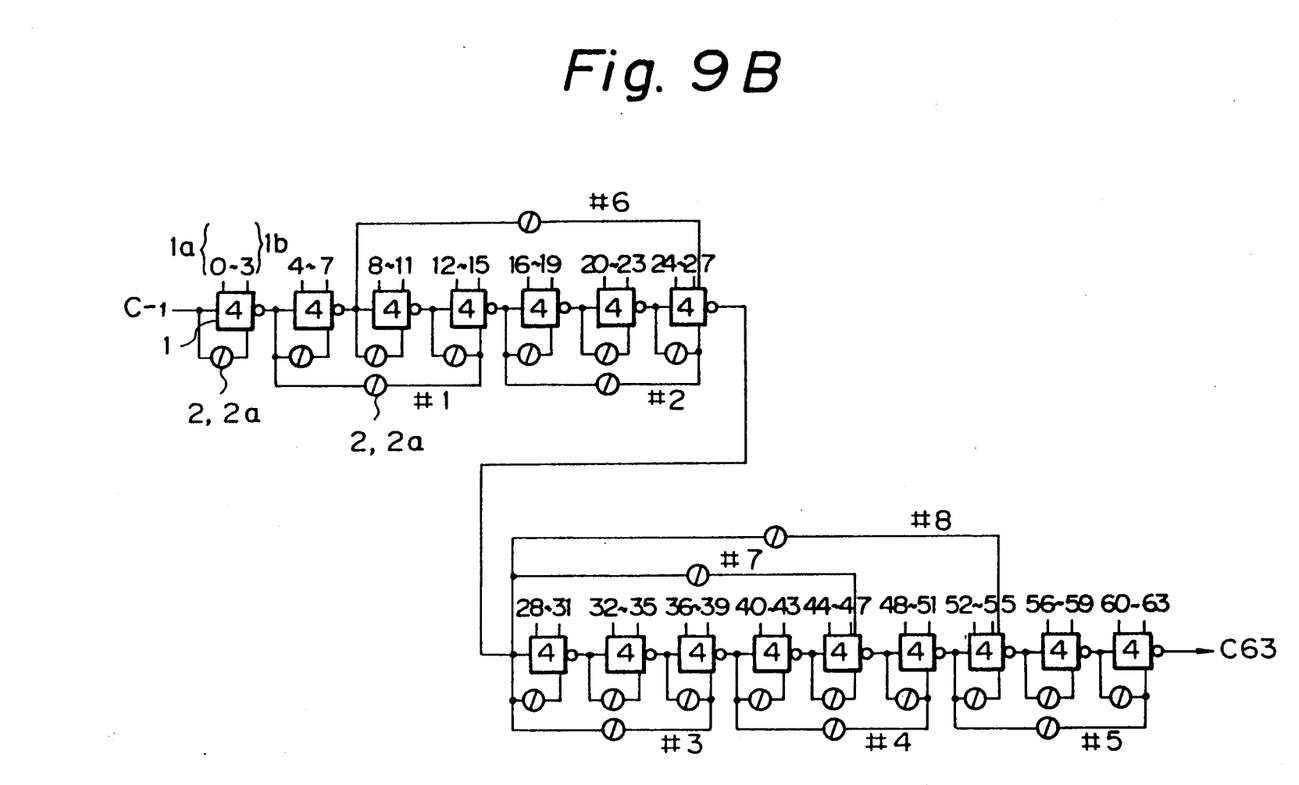
Figure 9C:
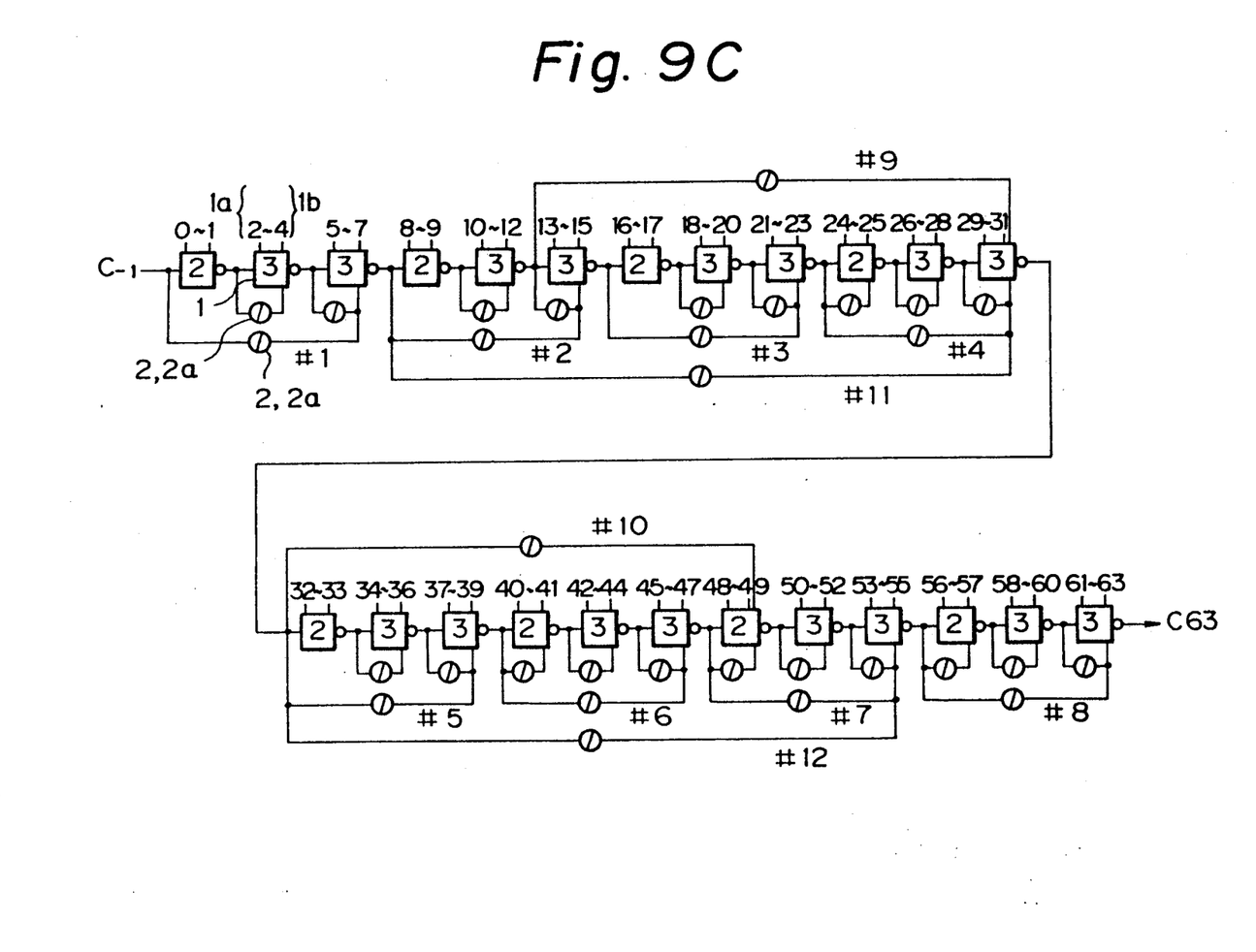

FIGS. 9A to 9B schematically illustrate constitutions according to still another embodiment of the present invention, each showing a constitution of the carry propagation circuit capable of reducing a critical path on the assumption that a quadruple bypath is applied to the sixty-four bit parallel-type full adder.

The circuit of FIG. 9A includes: a main path constituted by a plurality of blocks, each having a first bypath with units of three bits; second bypaths #1~#7, each bypassing three of the first bypaths; a third bypath #8 arranged to cover two of the second bypaths; and an outermost bypath #9 arranged to cover two of the second bypaths and include the third bypath. In this constitution, the longest critical path includes transfer gates of ten stages. The circuit of FIG. 9B includes: a main path constituted by a plurality of blocks, each having a first bypath with units of four bits; second bypaths #1~#5, each bypassing three of the first bypaths; third bypaths #6, #7, each being arranged to cover two of the second bypaths; and an outermost bypath #8 arranged to cover over two second bypaths and include one of the third bypaths. In this case, the longest critical path includes transfer gates of ten stages. Also, the circuit of FIG. 9C includes: a main path constituted by a plurality of blocks, each having a first bypath with units of two or three bits; second bypaths #1~#8, each bypassing three of the first bypaths; third bypaths #9, #10, each being arranged to cover two of the second bypaths; and outermost bypaths #11, #12, each being arranged to cover two of the second bypaths and include one of the third bypaths. In this case, the longest critical path includes transfer gates of nine stages.

As explained above, it becomes possible to decrease the number of transfer gates through which the carry signal passes in the critical path by increasing the number of bypaths. However, it should be noted that, where the number of bypaths is increased, the number of elements employed is increased and the generation of the control signal of the transfer gate is greatly delayed, resulting in less improvement in the processing speed. Accordingly, where the carry propagation circuit is applied to the full adder of sixty four bits or less, the triple bypath would be suitable from the relation between the processing speed and the number of additional elements.

The construction of the disclosed carry propagate circuit is not limited to CMOS devices, but may employ NMOS, PMOS, or other metal-insulator-semiconductor transistors, MESFETs and HEMTs. As the construction by bipolar transistors is also possible for the part of the circuit except for the transfer gates, the circuit may be implemented in Bi-CMOS (mixed bipolar and CMOS) circuitry with an improved performance.

Furthermore, implementation of the whole carry propagate circuit is possible by pure bipolar devices. For instance, the circuit to generate the signal $C_i$ in FIG. 5 can be constructed equivalently in the wired-OR connection of the output terminals of three ECL (emitter coupled logic) gates which generate signals $P_i \cdot \overline{P_i'} \cdot C_{i-1}$, $\overline{P_i} \cdot A_i$, and $P_i' \cdot C_i'$, respectively. In this case, the control means and the transfer circuit of the main path or bypath (1 and 1b, 2 and 2a) can be merged together into one logic gate. Implementation of the other part of the carry propagate circuit by other than CMOS devices is straighforward, and the description in detail is therefore omitted.

Although the present invention has been disclosed and described by way of various embodiments, it is apparent to those skilled in the art that other embodiments and modifications of the present invention are possible without departing from the spirit or essential features thereof.

I claim:

1. A carry propagation circuit of a parallel-type full adder having a plurality of bits, said carry propagate circuit comprising:
   control means for controlling a carry propagation;
   a main path including a plurality of transfer circuits having input and output ends and serially connected at corresponding nodes, each said main path transfer circuit being provided for a respective bit of said plurality of bits and transferring a carry signal from a lower bit to a higher bit when said control means brings said main path transfer circuit to an ON state; and
   at least one bypass arranged to bypass a predetermined number of said transfer circuits of said main path and each said bypass comprising a transfer circuit having input and output ends, said control means selectively bringing said bypass transfer circuit to an ON state or an OFF state, said output end of said bypass transfer circuit and an output end of a main path transfer circuit corresponding to the highest bit among bits to be bypassed in the main path are coupled to an identical said node and, when said control means brings said bypass transfer circuit to the ON state and propagates a carry signal thereby to the higher bit side, it brings said main path transfer circuit provided immediately in the lower bit side of said main path, as seen from the identical node, to the OFF state and prevents a carry signal from being generated from said OFF state transfer circuit.

2. A carry propagation circuit as set forth in calim 1, wherein said bypass includes a second transfer circuit brought to an ON or OFF state by said control means and is brought to an enable or disable state according to the ON or OFF operation of said second transfer circuit.

3. A carry propagation circuit as set forth in claim 2, wherein each transfer circuit included in said main path and bypass is constituted by a transfer gate consisting of a P-channel transistor and an N-channel transistor connected in parallel with each other.

4. A carry propagation circuit as set forth in claim 2, wherein said bypass is arranged to have a beginning point between an adjacent two of said plurality of transfer circuits included in said main path and to have a terminated point at an output node of a transfer gate provided in the higher bit side of said main path seen from said beginning point.

5. A carry propagation circuit as set forth in claim 4, wherein said control means includes a first control circuit for controlling the ON/OFF operation of each said main path transfer circuit and a second control circuit for controlling the ON/OFF operation of each said bypass transfer circuit.

6. A carry propagation circuit as set forth in claim 5, wherein said first control circuit provided for a transfer gate to which the terminated point of said bypass is connected brings said transfer gate to the ON state or OFF state in cooperation with said second control circuit.

7. A carry propagation circuit as set forth in claim 5, wherein said first control circuit provided for a transfer gate to which the terminated point of said bypass is not connected brings said transfer gate to the ON state or OFF state in itself.

8. A carry propagation circuit as set forth in claim 5, comprising a plurality of bypasses arranged in a multiple form, each said bypass including a transfer circuit having an output end coupled to said identical node,
   wherein, when said second control circuit of said control means brings one of said bypass transfer circuits to an ON state, it brings all remaining said bypass transfer circuits to an OFF state and prevents a carry signal from being generated from a transfer circuit coupled to the identical node in the main path.

9. A carry propagation circuit as set forth in claim 5, comprising:
   a first bypass arranged to bypass at least two of said plurality of transfer circuits included in said main path;
   a second bypass arranged not to overlap said first bypass and to bypass at least two of said plurality of transfer circuits included in said main path; and
   a third bypass arranged to have a beginning point between an adjacent two of the transfer circuits bypassed by said first bypass and to have a terminated point at an output node of one of the transfer circuits bypassed by said second bypass.

* * * * *

UNITED STATES PATENT AND TRADEMARK OFFICE
CERTIFICATE OF CORRECTION

PATENT NO. : 5,025,409

DATED : June 18, 1991

INVENTOR(S) : GOTO

It is certified that error appears in the above-identified patent and that said Letters Patent is hereby corrected as shown below:

Col. 3, line 41, change "in" to --is--.

Col. 7, line 12, change "#1 ~ 190 10" to --#1 ~ #10--.

Col. 10, line 8, after "path" insert --as--.

Signed and Sealed this

Thirteenth Day of July, 1993

Attest:

MICHAEL K. KIRK

*Attesting Officer*  *Acting Commissioner of Patents and Trademarks*